United States Patent [19]
Metzinger et al.

[11] 3,724,339
[45] Apr. 3, 1973

[54] MACHINE FOR INSERTING FILTERS INTO TIP-HOLDERS FOR SMOKERS ARTICLES

[75] Inventors: Adrifn Louis Metzinger, Cheseaux-Noreaz; Charles Raillard, Yverdon, both of Switzerland

[73] Assignee: British-American Tobacco Company Limited, London, England

[22] Filed: Aug. 31, 1971

[21] Appl. No.: 176,574

[30] Foreign Application Priority Data

Sept. 14, 1970  Switzerland .......................13614/70

[52] U.S. Cl. ....................93/1 C, 83/411 R, 29/208 F
[51] Int. Cl. ................................................A24c 5/52
[58] Field of Search .......93/1 C; 83/411 R; 29/203 S; 221/10

[56] References Cited

UNITED STATES PATENTS

| | | | |
|---|---|---|---|
| 3,067,644 | 12/1962 | Dearsley | 83/411 R |
| 3,257,883 | 6/1966 | Dearsley | 83/411 R |
| 3,297,200 | 1/1967 | Andrews et al. | 221/10 |
| 3,361,138 | 1/1968 | Metzinger et al. | 93/1 C |
| 3,464,421 | 9/1969 | Pinkham et al. | 93/1 C |

*Primary Examiner*—Andrew R. Juhasz
*Assistant Examiner*—John Sipos
*Attorney*—Eric H. Waters et al.

[57] ABSTRACT

Elongated filter sections are fed from a feed channel to a transfer drum which transfers them to peripheral compartments on a receiving cylinder where they are pushed against a stop by pneumatic means acting in a first zone upstream of means for cutting off filter tips. Transfer means deliver the filter tips to a drum comprising pusher means for inserting the filter tips in tip holders, and the remainders of the sections are pushed against the stop by the pneumatic means acting in a second zone. Means for sensing the absence of filter sections in said compartments actuate electromagnetic means for controlling the supply of filter sections from the feed channel to the transfer drum.

9 Claims, 2 Drawing Figures

PATENTED APR 3 1973

MACHINE FOR INSERTING FILTERS INTO TIP-HOLDERS FOR SMOKERS ARTICLES

The present invention relates to machines for inserting filters in tip holders for smoking articles, notably for cigars.

In known mechanisms for this purpose the various operations of transfer of filter sections to be cut into filter tips take place mechanically, which necessitates a great precision in the construction of relatively complicated mechanisms which must be able to work at high rates.

According to the invention, there is provided a machine for inserting filters in tip holders for smoking articles such as cigars, comprising a device for feeding elongated filter sections onto a rotatable receiving cylinder having a plurality of peripheral filter section receiving compartments, pneumatic means for pushing the filter sections in said filter section receiving compartments into abutment against a stop, cutting means for cutting each filter section held against said stop to form a filter tip adjacent the stop and a remainder spaced apart from the stop, transfer means for transferring the filter tips from the receiving cylinder onto a rotatable drum having means for inserting the filter tips into tip holders, means for defining first and second zones of action of said pneumatic means, a first zone of action upstream of said cutting means, and a second zone of action downstream of said cutting means and transfer means, in which second zone of action the pneumatic means pushes the remainder of each filter section into abutment against said stop, detection means for detecting the absence of filter sections in said compartments, supply means for supplying filter sections to said device for feeding filter sections onto said receiving cylinder, and control means for controlling said supply means to supply filter sections at the same rate as said detection means detects the absence of filter sections in said compartments.

The accompanying drawings show, by way of example, an embodiment of a machine according to the present invention.

Figure 1:
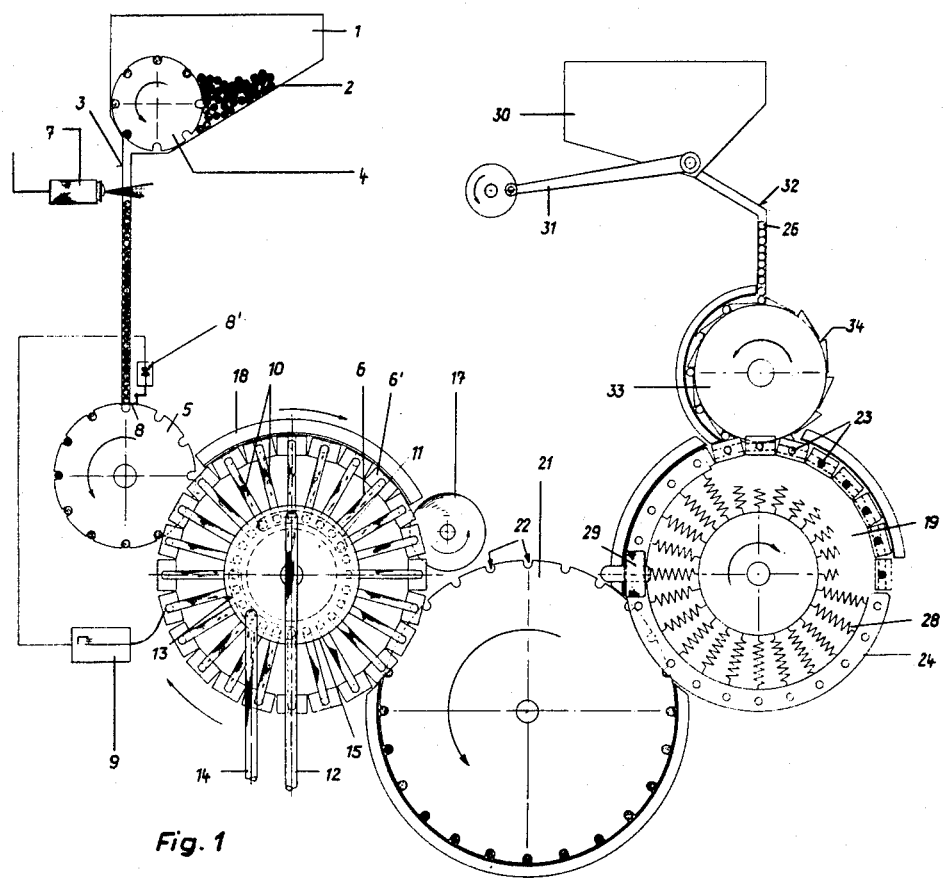
FIG. 1 is a schematic elevational view showing the principal parts of the machine.
Figure 2:
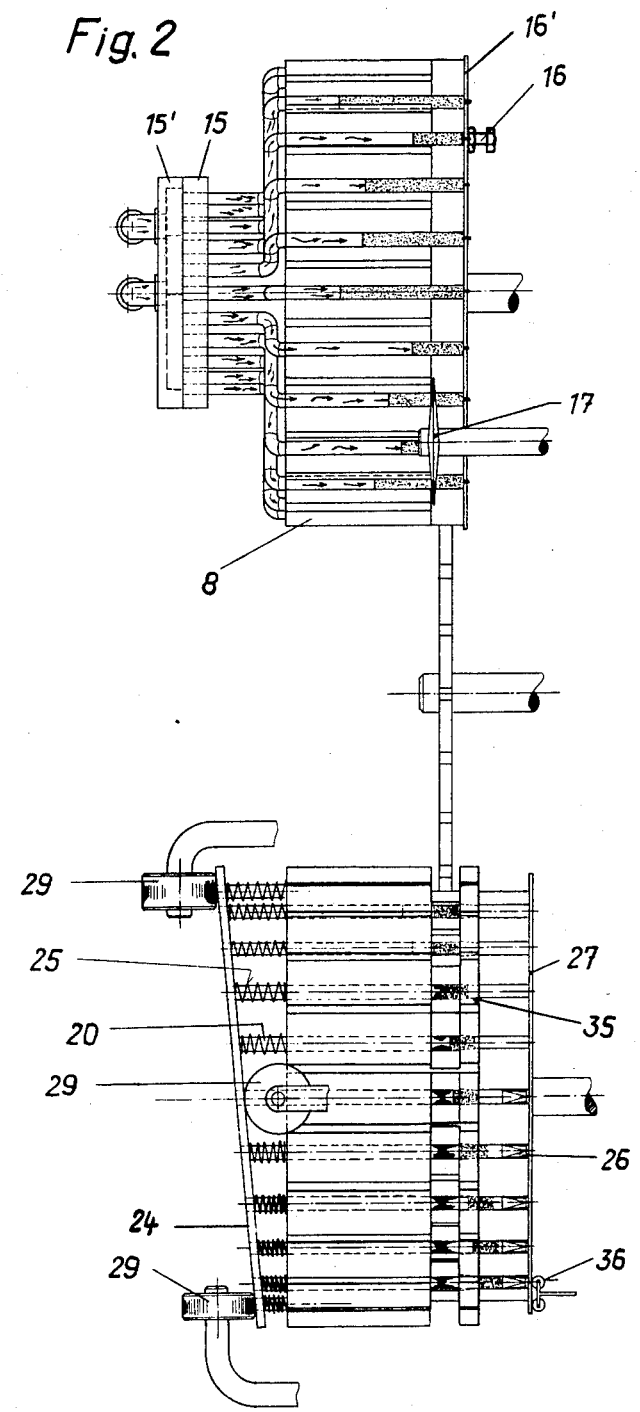
FIG. 2 is a partial view thereof in lateral elevation.

The machine shown is for inserting filters in tip holders for cigars, especially for small cigars known as "cigarillos". This machine comprises a device for feeding filter sections from a hopper 1, these sections being transferred from the hopper into a feed channel 3 by a first drum 4 driven by means of an electro-magnetic clutch (not shown). The feed channel 3 leads to a second drum 5 with peripheral compartments for the transfer of the filter sections 2 onto a receiving cylinder 6. For this purpose, the receiving cylinder 6 has peripheral bridges 6' fixed onto end flanges of the cylinder, each bridge 6' having a compartment designed to receive a filter section 2. A photo-electric cell device 7 is connected to the electro-magnetic clutch of the drum 4 to control feed of the filter sections 2 in the channel 3.

A member for stopping the filter sections at the lower end of the feed channel 3 is actuated by an electro-magnet 8' itself controlled by a detector 9 reacting in the absence of a filter element in the compartments of the cylinder 6 as will be described in detail later on.

Conduits 10 for compressed air connect the compartments in the bridges 6' to a central rotatable half-ring 15, a cooperating fixed half-ring 15 comprising two grooves 11, 13 defining two zones of action and being respectively connected to conduits 12 and 14 for the supply of compressed air.

Stops 16 located in front of the bridges 6' of the receiving cylinder 6 are formed by screws screwed into a disc 16' facing the compartments and serving to hold the filter elements contained in these compartments, the distance between these stops 16 and a circular blade 17 determining the length of the filter tips cut from the sections 2. This distance is adjustable by screwing in or out the screws 16. So as not to overcharge the drawing, only a single screw is shown. A supple envelope 18 is located at the upper part of the receiving cylinder 6 for preventing the filter sections being blown out of their compartments during the blowing phase as will be described below. A similar supple envelope (not shown) is located below the receiving cylinder 6 to prevent filter sections from falling out under the effect of gravity.

The machine additionally comprises a transfer disc 21 with peripheral compartments 22 in which the filter tips from the receiving cylinder 6 are deposited. These filter tips pass from the disc 21 into compartments 23 of a drum 19. Pushers 20 controlled by an oscillable cam-forming ring 24 are located in the compartments 23 to act on the filter tips and springs 25 hold the pushers against the ring 24. This ring 24 is mounted on radial springs 28 and rollers 29 in contact with the oscillating ring 24 are positionally adjustable parallel to the axis of the drum 19 to enable adjustment of the inclination of the ring and consequently the path of the pushers 20.

Tip holders 26 in plastics material are stocked in a hopper 30 provided with a vibrator 31. From the hopper 30, the tip holders 26 pass into a slideway 32 which delivers them onto a drum 33 with peripheral compartments 34 from where they are transferred one by one into the compartments 23 of the drum 19. The tip holders 26 are applied by an abutment ring 27 against pieces 35 with conical holes facing the compartments 23 for passage of the filter tips. The abutment ring 27 rotates with the drum 19 and the distance between the perforated pieces 35 and this ring 27 is adjustable by means of support rollers 36.

In operation, the filter sections 2 are delivered one by one to the feed channel 3 by means of the drum 4. When the channel 3 is full, the photo-electric cell 7 acts to cut off current to the electro-magnetic clutch of the drum 4. The feed of filter sections 2 is thus interrupted as soon as the drum 4 stops. From the feed channel 3, the filter sections 2 fall, by gravity, one by one into the compartments of the rotating drum 5 and from there are deposited in the compartments of the receiving cylinder 6.

Compressed air delivered via the groove 11 of the half ring 15' pushes the filter sections 2 in the compartments of the bridges 6' against stops 16. The circular blade 17 cuts the thus held filter sections to the desired length. The supple envelope 18 not only prevents the filter sections from being driven out of their compartments during this blowing phase, but also prevents an over great leakage of the air.

The remainder of the filter section in each compartment of the receiving cylinder 6, once the cut-off filter-tip is transfered to the disc 21, is once more applied against the stops 16 by the compressed air delivered via the groove 13 fed by the conduit 14, and the detector 9 remains inoperative. To the contrary, each time that there is no filter section in a compartment of the bridge 6', the detector 9 acts on the electromagnet 8' which actuates the stopping member 8 in a manner to free the feed channel 3 and allow the feed of filter sections to compartments of the drum 5 to compensate for filter sections fed to empty compartments of the bridges 6'.

The filter tips cut by the circular blade 17 are deposited in the compartments 22 of the transfer disc 21 and pass from there into the compartments 23 of the drum 19. These filter tips are progressively pushed through the conical holes of the pieces 35 by the pushers 20 so as to be inserted in the tip holders 26 brought to face the compartments 23 as described above.

The tip holders each provided with a filter tip fall under their own weight into a recipient (not shown) under the drum 19.

The described machine can operate at a high work rates of up to 500 tip holders/minute, due to the pneumatic control of the filter sections in the receiving cylinder and the means provided for replacing filter sections as they are used up.

What is claimed is:

1. A machine for inserting filters in tip holders for smoking articles such as cigars, comprising a device for feeding elongated filter sections onto a rotatable receiving cylinder having a plurality of peripheral filter section receiving compartments, pneumatic means for pushing the filter sections in said filter section receiving compartments into abutment against a stop, cutting means for cutting each filter section held against said stop to form a filter tip adjacent the stop and a remainder spaced apart from the stop, transfer means for transferring the filter tips from the receiving cylinder onto a rotatable drum having means for inserting the filter tips into tip holders, means for defining first and second zones of action of said pneumatic means, a first zone of action upstream of said cutting means, and a second zone of action downstream of said cutting means and transfer means, in which second zone of action the pneumatic means pushes the remainder of each filter section into abutment against said stop, detection means for detecting the absence of filter sections in said compartments, supply means for supplying filter sections to said device for feeding filter sections onto said receiving cylinder, and control means for controlling said supply means to supply filter sections at the same rate as said detection means detects the absence of filter sections in said compartments.

2. A machine as claimed in claim 1, in which said supply means comprises a hopper for filter sections, a filter section supply drum, and means for rotating the filter section supply drum to transfer filter sections from the hopper to a feed channel; said feeding device comprises a filter section transfer drum having a plurality of peripheral filter section transfer compartments each for receiving a filter section from said feed channel, said filter section transfer drum being rotatable in synchronization with said receiving cylinder so that said filter section transfer compartments cooperate with the filter section receiving compartments of said receiving cylinder; and said control means comprises (a) photo-electric means for controlling rotation of said filter section supply drum as a function of the number of filter sections in said feed channel, and (b) electro-magnetic means controlled by said detection means for controlling the supply of filter sections from said feed channel to said filter section transfer compartments.

3. A machine as claimed in claim 2, in which said means defining the first and second zones of action of the pneumatic means comprise a fixed half-ring and a cooperating rotatable half-ring mounted for rotation with said receiving cylinder, said fixed half-ring comprising first and second grooves, and means for supplying compressed air to said first and second grooves, said rotatable half-ring comprising conduits for the delivery of compressed air to each of said filter section receiving compartments, each of said conduits passing by and cooperating with said first and second grooves during rotation of said receiving cylinder; and further comprising fixed means disposed about the periphery of said receiving cylinder between said transfer drum and said cutting means and between said transfer means and said transfer drum for preventing unwanted removal of filter sections from said filter section receiving compartments.

4. A machine as claimed in claim 3, in which said cutting means comprise a circular blade disposed perpendicularly to filter sections in said filter section receiving compartments, and comprising means for adjusting the position of said stop relative to said blade to enable adjustment of the length of said filter tips.

5. A machine as claimed in claim 2, in which said transfer means comprise a disc having a plurality of peripheral filter tip transfer compartments, said disc being rotatable in synchronization with said receiving cylinder and with said rotatable drum so that filter tips are succesively transferred from said filter section receiving compartments to said filter tip transfer compartments and to filter tip housings disposed in the periphery of said rotatable drum; said rotatable drum comprising tip holder receiving spaces each corresponding to one of said filter tip housings, a plurality of pushers each for pushing a filter tip in one of said housings towards the corresponding tip holder receiving space, and a peripheral ring oscillable in the axial direction of said rotatable drum in synchronization with rotation of said drum for controlling movement of said pushers.

6. A machine as claimed in claim 5, in which said oscillable ring is mounted on radial springs and is urged by axial spring means acting substantially parallel to the axis of the rotatable drum, and comprising a plurality of rollers bearing against said oscillable ring and inclining said oscillable ring in relation to the plane of said rotatable drum against the action of said axial spring means, said rollers being positionally adjustable in a direction parallel to the axis of said rotatable drum to enable adjustment of the inclination of said ring and consequently the path of said pushers.

7. A machine as claimed in claim 5, comprising means for supplying tip holders one by one into said tip holder receiving spaces, said rotatable drum comprising between each filter tip housing and the corresponding tip holder space a trunco-conical passageway for radially compressing the filter tips as they are pushed from a filter tip housing into a tip holder in the corresponding tip holder space.

8. A machine as claimed in claim 7, in which said means for supplying tip holders comprises a second hopper for tip holders, means for vibrating tip holders in said second hopper for transferring the tip holders to a slideway for supplying tip holders by gravity to a tip holder transfer drum comprising a plurality of peripheral tip holder transfer compartments, said tip holder transfer drum being rotatable in synchronization with said rotatable drum so that said tip holder transfer compartments cooperate with said tip holder spaces.

9. A machine as claimed in claim 7, in which each tip holder space is limited by an abutment ring coaxial to said rotatable drum, and comprising positionally adjustable support rollers bearing against said abutment ring to enable adjustment of the separation of said abutment ring from said trunco-conical passageways.

* * * * *